United States Patent
Pasternack

[19]

[11] Patent Number: 6,093,257
[45] Date of Patent: Jul. 25, 2000

[54] METHOD FOR CLEANING A SUBSTRATE WITH A COMPOSITION COMPRISING RADIATION CURABLE GROUPS

[75] Inventor: George Pasternack, Elgin, Ill.

[73] Assignee: DSM N.V., Heerlen, Netherlands

[21] Appl. No.: 09/039,265

[22] Filed: Mar. 16, 1998

Related U.S. Application Data

[60] Provisional application No. 60/040,928, Mar. 17, 1997.

[51] Int. Cl.⁷ ..................................................... C23D 17/00
[52] U.S. Cl. ................................. 134/38; 134/40; 134/26; 134/10; 134/13; 427/496; 427/499; 427/507; 427/508; 427/520; 427/551; 427/553; 427/307; 427/322
[58] Field of Search ................................. 134/38, 40, 26, 134/10, 13; 427/496, 499, 507, 508, 520, 551, 553, 595, 596, 307, 308, 309, 322, 325, 327, 345

[56] References Cited

U.S. PATENT DOCUMENTS

| | | | |
|---|---|---|---|
| 4,196,018 | 4/1980 | Inoko et al. | 134/6 |
| 5,525,371 | 6/1996 | Sweeney et al. | 427/327 |

*Primary Examiner*—Timothy Meeks
*Attorney, Agent, or Firm*—Pillsbury Madison & Sutro

[57] ABSTRACT

A method of cleaning a substrate by covering the substrate with a composition in a sufficient amount to clean the substrate. The composition includes a substantial amount of at least one low viscosity organic compound which includes a radiation curable group. The compound is reclaimed for further use. The reclaimed compound may be used as a reactive diluent in a radiation curable coating composition.

18 Claims, 1 Drawing Sheet

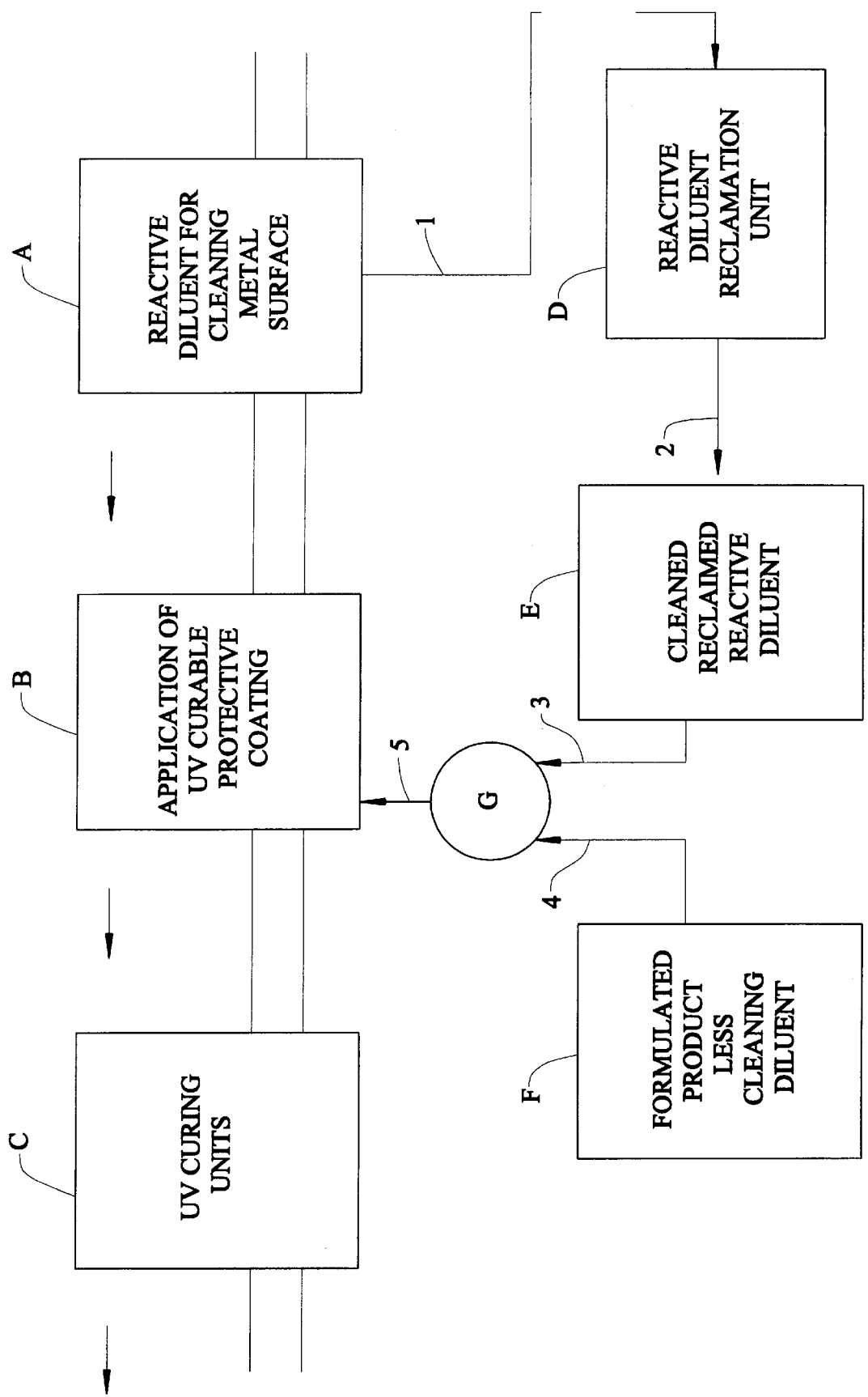

METHOD FOR CLEANING A SUBSTRATE WITH A COMPOSITION COMPRISING RADIATION CURABLE GROUPS

This application claims the benefit of U.S. provisional application No. 60/040,928, filed Mar. 17, 1997.

BACKGROUND OF THE INVENTION

1. Field of the Invention

The invention relates to a method of cleaning a substrate, in which the cleaning composition is reclaimed for further use.

2. Description of Related Art

Bare substrates are often coated in order to protect and decorate the surface of the substrate. Before coating, it is necessary to clean the surface of the substrate in particular to remove contaminants and or temporary protective coatings in order to enhance the adhesion between the coating and the substrate. Generally, substrates are cleaned using inert organic solvents. The organic solvents are often used several times, but sooner or later the solvents have to be discarded because of contamination. This is a disadvantage because the organic solvents are a burden for the environment.

SUMMARY OF THE INVENTION

It is an object of the present invention to find a method for cleaning a substrate, in which the cleaning fluid is not discarded and can be reclaimed for further use.

The invention pertains to a method of cleaning a substrate by:
 a) covering or rinsing the substrate with a composition comprising a substantial amount of at least one low viscosity organic compound, the compound comprising a radiation curable group and being present in the composition in sufficient amount for cleaning the substrate, and
 b) reclaiming said compound for further use.

This method is in particular suitable for the cleaning of metal substrates, which are subsequently coated with a radiation curable coating. The reclaimed cleaning fluid can be used as a reactive diluent in the coating. Optionally, the used cleaning fluid is purified before use in the coating composition.

The invention also pertains to a two component system, comprising a first part, being a low viscosity organic composition comprising at least one low viscosity compound having a radiation curable group, and a second part, which comprises the constituents of a radiation curable coating composition without the first component.

The invention also pertains to a process for coating a substrate by
 a) supplying a two component system comprising a first part, a low viscosity organic composition comprising at least one low viscosity compound having a radiation curable group, and a second part, which comprises the constituents of a radiation curable coating composition, without the first component,
 b) cleaning the substrate by covering or rinsing the substrate with the low viscosity organic composition,
 c) reclaiming the at least one low viscosity organic compound, and
 d) using the reclaimed compound as a reactive diluent together with the second part of the two component system to make a radiation curable coating composition,
 e) coating the substrate with said coating composition,
 f) curing the coating by actinic radiation.

BRIEF DESCRIPTION OF THE DRAWING

The preferred embodiment of the present invention is shown more specifically with reference to the attached drawing, wherein FIG. 1 shows, schematically, how to use the invention for cleaning and coating cold rolled steel.

DETAILED DESCRIPTION OF THE INVENTION

The method of cleaning a substrate of this invention comprises
 a) covering or rinsing the substrate with a composition comprising a substantial amount of at least one low viscosity organic compound, the compound comprising a radiation curable group and being present in the composition in sufficient amount to clean the substrate, and
 b) reclaiming said compound for further use.

The method is very suitable for cleaning metal substrates, such as galvanized steel, stainless steel, aluminum or other metal substrates, as these substrates often are greased as a temporary protective layer. However, other substrates such as glass, wood or plastic also may need to be cleaned before applying a coating. The method of this invention is suitable for these substrates as well. Also, the protective coatings may contain radiation-curable groups which may be reclaimed for further use. Such protective coatings can be curable through, for instance, radical, cationic or anionic polymerization.

As the method of cleaning involves the use of a compound that is applicable as a reactive diluent in a radiation curable coating composition, the compound can be easily reclaimed for further use, in particular for use as a reactive diluent. Hence, it is an advantage of the present invention, that the low viscosity cleaning compound has to be used only once, or only a few times, before it is reclaimed for another use. Thereby, one precludes the build-up of difficult to remove impurities.

It may be necessary or useful, to purify the low viscosity compound after its use as cleaning fluid. Purification can be done by filtration and selective absorption of unwanted material. An example of a suitable purifying device is a filter having a porosity suitable to remove undesirable particulate matter, an absorbent such as molecular sieves and/or activated carbon to selectively remove water, grease and other undesirable matter originating from the surface to be coated. Suitable filters can be of a naturally occurring or synthetic type, and may be chemically composed of the following elements: silicon, aluminum, magnesium, calcium, carbon, hydrogen and oxygen. Examples of suitable filters include molecular sieves, bentonites, zeolites, paper, activated carbon and ion exchange resins. The filter may be in the form of a fiber, gel or solid particles. The filter system may comprise one or more filters.

Generally, it will not be necessary to remove all impurities from the cleaning fluid, as long as the remaining impurities do not have a detrimental influence on the characteristics of the radiation curable coating or the cured coating.

The method of the invention is very suitable for use with radiation curable coating compositions, in particular those compositions that cure through radical, anionic or cationic polymerization. Radical polymerization is preferred. Preferably, the low viscosity organic compound that is used as a substantial amount of the cleaning fluid, comprises as a radiation curable group an ethylenic unsaturation, an epoxy group or the like.

Generally, the low viscosity organic compound has a molecular weight of lower than 600 or a viscosity lower than 500 mPa.s at 24° C. The viscosity of the composition during cleaning preferably is lower than 200 mPa.s; the cleaning of the substrate may be performed at an elevated temperature and/or at an elevated pressure. A compound having a viscosity higher than about 500 mPa.s at 24° C. will be less effective as a cleaning compound.

Suitable ethylenically unsaturated or epoxy groups include for example acrylate, methacrylate, vinylaromatic, N-vinyl, vinylether, vinylester, allyl, ethylenically unsaturated dicarboxylic acid ester, 1,2-alkylepoxy, or cycloalkylepoxy. Particularly preferred are (meth)acrylate, vinylether, N-vinyl and maleate type of unsaturated dicarboxylic acid ester groups.

Suitable examples of the low viscosity compounds include those compounds that comprise a group that has a strong solvent power for the particular type of contamination to be removed and a radiation curable group. Suitable groups with strong solvency power include cyclic aliphatic groups with or without a hetero atom such as cyclohexyl, tetrahydrofurfuryl, isobornyl or caprolactam; long alkyl chains with or without a hetero atom such as stearyl or lauryl or oligoethers; and aromatic groups such as phenoxy or alkylphenoxy, halogenated alkyl and cyanoalkyl groups. The low viscosity compound may be adapted to clean surfaces that are contaminated with compounds having (slightly) polar groups. In that case, polar groups are preferably part of the compound. As is evident from the above description, most existing reactive diluents can be used as the substantive part in a cleaning fluid for the process of the present invention.

In addition to the low viscosity compound, additives may be present to facilitate the removal of contaminants from the surface. As additives, small amounts of surfactants or chelating agents can be used.

Suitable low viscosity compounds, comprise for example, substituted and unsubstituted cyclic aliphatic groups with or without a hetero atom, such as for example:

cyclohexyl
4-butylcyclohexyl
tetrahydrofurfuryl
isobornyl
pyrrolidenyl
morpholino
thiomorpholino
propylene carbonate
dihydrodicyclopentadienyl
1,2-epoxycyclohexyl and
1,4-cyclohexane dimethanol.

Examples of suitable groups being linear or branched alkyl chains with or without a heteroatom include:

butyl
isobutyl
tertiary butyl
hexyl
ethyl hexyl
isodecyl
lauryl
stearyl
dimethylaminoethyl tetramethylene 1,3 diol
tetramethylene 1,10 diol
hexamethylene 1,6 diol
hexamethylene 1,4 diol
2,5,8,11-oxatridecyl
neopentyl
4-hydroxybutyl
2-methoxyethyl
3,6,9-oxaundecane-1,11-diol
3,6,9-oxa-2,5,8,11-methylundecane-1,11-diol Further examples of suitable groups include aromatic groups, such as for example:

phenoxylethyl
benzyl
1-(4-nonylphenoxy)-2-oxapentyl, and other groups such as for example:

4-chlorobutyl
3-cyanopropyl
2,4-dichlorobutyl

Other examples of suitable groups that are groups comprising two or more polymerizable groups are for example:

ethoxylated pentaerythritol trimethylolpropane, and propoxylated glyceryl

As the low viscosity compound comprising a radiation curable group preferably is reclaimed for use as a reactive diluent in a radiation curable coating composition, the invention also pertains to a two component system comprising as a first part, a low viscosity organic compound comprising a radiation curable group, and a second part, which comprises the constituents of a radiation curable coating composition, without the compound of the first part.

The constituents of the radiation curable coating composition are known in the art, and generally comprise oligomers with an average of 2 or more radiation curable groups, reactive diluents, photosensitive radical producing compounds (photoinitiators) and often additives like stabilizers and rheology aids. Examples of oligomers include acrylate functional bisphenol-A comprising compounds, acrylated acrylic oligomers, acrylate urethane oligomers, vinylether urethane oligomers, unsaturated polyester, maleate-end-capped oligomers, epoxyfunctional polyesters, epoxyfunctional polyethers such as epoxyfunctional novolac resins or bisphenol-A oligomers and the like. Generally, the oligomers have a molecular weight between 500 and 10,000, preferably between 800 and 5,000. Generally, the amount of oligomer is between about 20 and 80 wt. % of the radical curable coating composition.

The reactive diluents that eventually are used in the radical curable coating composition are in part or as a whole used to clean the substrate. The reactive diluents may be monofunctional, difunctional or trifunctional, and the diluents can be a mixture of several diluents, or one diluent only. Non-limiting examples of diluents include tetrahydrofurfuryl acrylate (THFA), trimethylolpropane triacrylate and/or hexane diol diacrylate (HDDA).

Photoinitiators for either type of polymerization are well known in the art. A commonly used example is IRGACURE™ 184, 1-benzoylcyclohexanol. The photoinitiator generally is used in amounts of 0.1 to 10 wt. %. Preferably, 0.5 to 5 wt. % of photoinitiator is used and curing is effected by irradiating, in a non-limiting example, with UV or UV-VIS light at wavelength between 200–600 nm at a dose of 0.1–3 J/cm$^2$. For electron beam cure no photoinitiator is necessary.

According to this invention, a process for coating a substrate is provided, by
a) supplying a two component system comprising as a first part, a low viscosity organic composition comprising at least one low viscosity organic compound having a radiation curable group, and a second part, which comprises the constituents of a radiation curable coating composition, without the compound of the first part,
b) cleaning the substrate by covering or rinsing the substrate with the low viscosity organic composition,
c) reclaiming the at least one low viscosity organic compound, and
d) using the reclaimed compound as a reactive diluent together with the second part of the two component system to make a radiation curable coating composition,
e) coating the substrate with said coating composition,
f) curing the coating by actinic radiation.

This process has the advantage, that no organic cleaning material is to be discarded, as the cleaning is done with a compound that is reclaimed and used in the coating.

The invention is demonstrated by FIG. 1, which represents a scheme how to use the invention for cleaning and coating cold rolled steel.

In FIG. 1, A is the cleaning station in which the metal surface is cleaned by the low viscosity organic composition. The cleaned metal is transported to B, where a UV curable coating is applied. From the coating application station B, the coated metal is transported to C, the coating curing station. At station C, the UV curable coating is cured with UV light.

After the metal is cleaned using the cleaning composition, this composition is fed through line 1 to a reclamation unit D. The reclamation unit comprises a filter, and optionally an absorbent column such as a column comprising molecular sieves and/or activated carbon. From the reclamation unit, the purified low viscosity organic compound having a radiation curable group is fed through line 2 to a reservoir E. Reservoir F, contains a formulated product less the compound used in the cleaning process. The final coating composition is made in the metering device G, which is fed by lines 3 and 4, and which supplies the coating composition through 5 to the coating application station B.

The following is a non-limiting example of a composition and method according to the invention.

EXAMPLE

A coating composition with a viscosity of 1000 to 5000 mPa.s at 24° C. is made, in a non-limiting example, as follows:

Urethane acrylate (oligomer) 25–35 wt. %
Tetrahydrofurfuryl acrylate (THFA) (reactive diluent) 15–25 wt. %
Trimethylolpropane triacrylate (reactive diluent) 15–25 wt. %
Hexane diol diacrylate (HDDA) (reactive diluent) 15–25 wt. %
Acrylic acid (adhesion promoter) 0–4 wt. %
IRGACURE™ 184 (photoinitiator) 0–5 wt. %
DC 5 7 (silicone fluid to reduce surface tension) 0–0.5 wt. %
DC 193 (silicone fluid to reduce surface tension) 0–0.5 wt. %

In the above composition, all the THFA or a blend consisting of 10 parts of THFA and 10 parts of HDDA is used as the cleaning compound to clean the metal surface. After cleaning the metal surface, the cleaning compound is directed to the reclamation unit D for appropriate decontamination. The reclaimed cleaning compound is then directed to reservoir E to be properly blended with the remainder of the coating composition stored in reservoir F. The contents of the reservoirs are then blended in metering device G in the appropriate ratio to yield the composition in above example. The combined material is then applied to the metal substrate with appropriate equipment and the coated substrate passes through the curing chamber where the liquid coating is hardened upon exposure to actinic radiation.

A photoinitiator is not needed in the composition if the composition is subject to electron beam curing.

While the invention has been described with respect to certain embodiments thereof, it will be appreciated that variations and modifications may be made by one skilled in the art without departing from the spirit and scope of the invention.

What is claimed is:

1. A method of cleaning a substrate comprising:
cleaning at least a portion of said substrate with a composition comprising one low viscosity organic compound having a radiation curable group;
reclaiming said compound; and
using at least a portion of the reclaimed compound in a radiation curable coating composition.

2. The method according to claim 1, wherein the substrate is coated with a protective layer prior to cleaning the substrate with the composition.

3. The method according to claim 2, wherein
the protective coating is removed with the composition and
at least a portion of the protective coating is reclaimed.

4. The method according to claim 1, wherein the substrate is a metal substrate.

5. The method according to claim 1, further comprising using said reclaimed compound as a reactive diluent in a radiation curable coating composition.

6. The method according to claim 5, wherein said reclaimed compound is purified before being used as a reactive diluent.

7. The method according to claim 5, wherein said radiation curable coating composition is curable through radical polymerization, cationic polymerization, anionic polymerization or electron beam curing.

8. The method according to claim 1, wherein said low viscosity organic compound comprises an ethylenic unsaturated group or an epoxy group as said radiation curable group.

9. The method according to claim 8, wherein the ethylenic unsaturated group is a member selected from the group consisting of acrylate, methacrylate, vinylaromatic, N-vinyl, vinylether, vinylester, allyl and ethylenically unsaturated dicarboxylic acid ester.

10. The method according to claim 8, wherein the epoxy group is a member selected from the group consisting of 1,2-alkylepoxy and cycloalkylepoxy.

11. A method of cleaning a substrate comprising the steps of
(a) cleaning the substrate with a composition comprising at least one low viscosity organic compound, the compound comprising a radiation curable group, and
(b) reclaiming said compound for further use;
wherein at least a portion of the reclaimed compound is used in a radiation curable coating composition.

12. A process for coating a substrate comprising the steps of:
a) supplying a two component system comprising:
a first component, comprising a low viscosity organic composition comprising at least one low viscosity organic compound having a radiation curable group, and a second component, which comprises constituents of a radiation curable coating composition but with omission of a constituent comprising the first component;
b) cleaning the substrate by covering the substrate with the low viscosity organic composition;
c) reclaiming the at least one low viscosity organic compound;
d) using said reclaimed compound as a reactive diluent together with the second component of the two component system to make a radiation curable coating composition;
e) coating said substrate with said coating composition; and
f) curing said coating by actinic radiation.

13. The process according to claim 12, wherein the substrate is a metal substrate.

14. The process according to claim 12, wherein the substrate is a glass substrate.

15. The process according to claim 12, wherein the substrate is a plastic substrate.

16. The process according to claim 12, wherein the substrate is a wood substrate.

17. The process according to claim 12, wherein the substrate is a contaminated substrate.

18. The process according to claim 12, wherein the reclaimed compound is purified before being used as a reactive diluent.

* * * * *